(12) United States Patent
Tomita et al.

(10) Patent No.: US 6,641,855 B1
(45) Date of Patent: Nov. 4, 2003

(54) NOODLES CONTAINING TOFU PUREE

(75) Inventors: Mamoru Tomita, Kanagawa (JP);
Kazuyoshi Sotoyama, Kanagawa (JP);
Yusuke Miyazaki, Kanagawa (JP);
Shoji Wakao, Kanagawa (JP);
Masanori Hattori, Kanagawa (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 0 days.

(21) Appl. No.: 09/926,348

(22) PCT Filed: Mar. 17, 2000

(86) PCT No.: PCT/JP00/01637
§ 371 (c)(1),
(2), (4) Date: Oct. 18, 2001

(87) PCT Pub. No.: WO00/67593
PCT Pub. Date: Nov. 16, 2000

(30) Foreign Application Priority Data

May 7, 1999 (JP) .......................................... 11/127248

(51) Int. Cl.⁷ ................................................. A23L 1/16
(52) U.S. Cl. ...................... 426/557; 426/451; 426/634
(58) Field of Search ................................. 426/557, 634, 426/451

(56) References Cited

FOREIGN PATENT DOCUMENTS

| JP | 58-146249 | 8/1983 |
|----|-----------|--------|
| JP | 59-183664 | 10/1984 |
| JP | 61-12257 | 1/1986 |
| JP | 63-63358 | 3/1988 |
| WO | WO 99/35920 | 7/1999 |

OTHER PUBLICATIONS

Patent Abstracts of Japan, JP 06–046784, Feb. 22, 1994.
Patent Abstracts of Japan, JP 02–086747, Mar. 27, 1990.
Patent Abstracts of Japan, JP 59–071641, Apr. 23, 1984.
Patent Abstracts of Japan, JP 04–349866, Dec. 4, 1992.
A. Watanabe, et al., Korin Shoin, pp. 230–233, "Soybean Food Products", 1971.

*Primary Examiner*—Lien Tran
(74) *Attorney, Agent, or Firm*—Oblon, Spivak, McClelland, Maier & Neustadt, P.C.

(57) ABSTRACT

The purpose is to provide noodles having excellent texture and good taste that contain tofu puree having specific physicochemical properties, and relates to noodles containing tofu puree having the following physicochemical properties: a) viscosity of 20 to 3,000 mPa·s, b) dynamic storage modulus of 0.2 to 600 Pa, c) dynamic loss modulus of 0.2 to 250 Pa, and d) the average particle diameter of particles contained in the tofu puree of 2 to 15 μm and the 90% particle diameter of the particles of 35 μm or smaller.

3 Claims, 1 Drawing Sheet

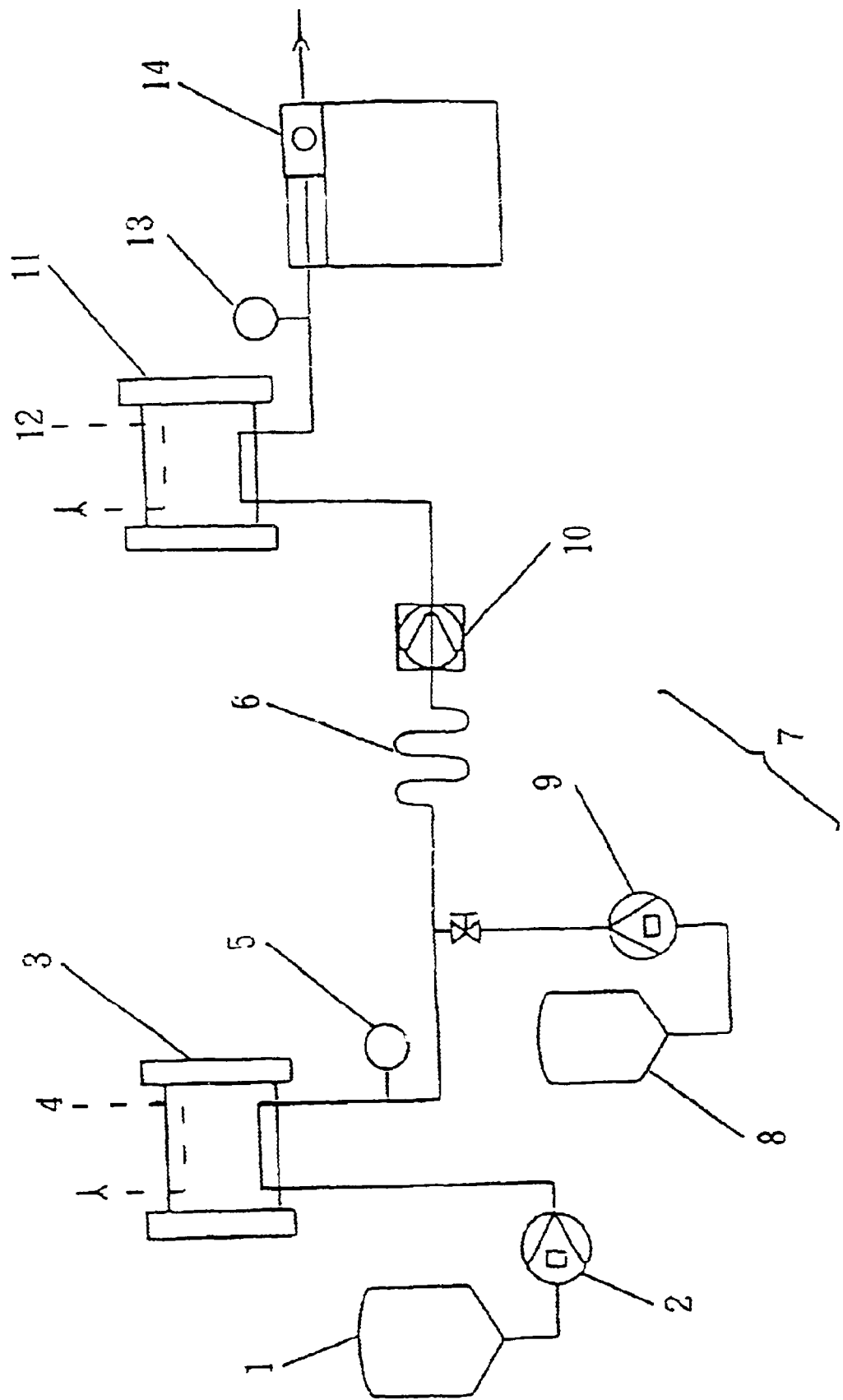

NOODLES CONTAINING TOFU PUREE

TECHNICAL FIELD

The present invention relates to noodles containing tofu puree, and particularly, the present invention relates to noodles with excellent texture and good taste containing tofu puree having physicochemical properties of a) viscosity being 20 to 3,000 mPa·s, b) dynamic storage modulus being is 0.2 to 600 Pa, c) dynamic loss modulus being 0.2 to 250 Pa, and d) average particle diameter of particles contained in the tofu puree being 2 to 15 μm and 90% particle diameter thereof being 35μm or smaller (hereafter the above a) through d) are sometimes referred to as specific physicochemical properties).

Note that with the exception of particle size distribution, the percentages (%) in the present Description are values by weight unless otherwise specified,.

Average particle diameter in the present Description means particle diameter corresponding to 50% of the particle size cumulative distribution and 90% particle diameter means particle diameter corresponding to 90% of the particle size cumulative distribution.

BACKGROUND ART

Conventionally, as technologies for producing tofu paste, a technology to process tofu with a water content of 87% into paste with a silent cutter, etc., is known (Japanese Laid-Open Patent Application No. H6-46784/1994; hereafter referred to as Prior Art 1). A technology is also disclosed in which coagulant is added to soy milk, which is set aside for approximately 30 minutes at 80° C., and soy milk coagulation product thus obtained is dehydrated to a water content of 70 to 80% using a pressing device and processed into paste with a high speed cutter or the like (Japanese Laid-Open Patent Application No. H2-86747/1990; hereafter referred to as Prior Art 2).

A technology is further disclosed in which coagulant is added to soy milk at 80° C. and the product is processed into in paste by a homogenizer (Japanese Laid-Open Patent Application No. S59-71641/1984; hereafter referred to as Prior Art 3).

As known technologies that employ soybean products to improve the quality of noodles, there are noodles to which soy flour is added at a ratio of 5 to 10% so that the noodles become difficult to lose the shape when boiled (Atsuji Watanabe et al, "Soybean Food Products," pages 232 to 233, Korin Shoin, 1971; hereafter referred to as Prior Art 4), noodles to which tofu or soy milk is added (Japanese Laid-Open Patent Application No. S58-146249/1983; hereafter referred to as Prior Art 5), food products having strands of coagulated raw materials containing soy milk and coagulant for coagulating soy milk (Japanese Laid-Open Patent Application No. H4-349866/1992; hereafter referred to as Prior Art 6), and so on.

However, the technologies disclosed in these prior arts have disadvantages as described below.

Conventional tofu paste is obtained by pasting tofu as is or after dehydration treatment thereof (that is, after the soy milk has completely coagulated) and, therefore, the paste that is obtained has the following properties of (1) through (5):

(1) viscosity being over 3,000 mPa·s;
(2) dynamic storage modulus being over 600 Pa;
(3) dynamic loss modulus being over 250 Pa;
(4) average particle diameter being over 15 μm; and
(5) 90% particle diameter being over 35 μm.

Therefore, the tofu paste that is obtained feels rough to the tongue and has a poor texture. Noodles to which this tofu paste is added based on the disclosure of Prior Art 5 or the like, also pose problems in terms of texture thereof, as is clear from the test examples discussed later.

Paste is also known, as previously mentioned, which is obtained by adding coagulant to soy milk at 80° C. and homogenizing the same with a homogenizer. Since this paste is made with a homogenizer only, average particle diameter thereof exceeds 15 μm and further 90% particle diameter thereof also exceeds 35 μm. Therefore, the paste feels rough to the tongue and has a poor texture. Noodles to which this tofu paste is added based on the disclosure of Prior Art 5 or the like, also have a problem that texture thereof is poor, as is clear from the test examples discussed later.

Further, the use of soybean flour or soy milk to improve the quality of noodles is known, as previously mentioned, but there are problems with both of these in that taste thereof is poor, as is clear from the test examples discussed later.

Food products having strands of coagulated raw materials containing soy milk and a coagulant for coagulating soy milk are known, as previously mentioned, but since the soy milk coagulation product is formed directly without being made into a paste, they pose problems that a uniform composition can not be obtained and texture thereof is poor.

Although as described above, tofu paste similar to tofu puree and the use of soy bean products, such as this tofu paste, etc., to improve the quality of noodles have been known in the past, noodles with excellent texture and good taste containing tofu puree having physicochemical properties of a) viscosity being 20 to 3,000 mPa·s,
b) dynamic storage modulus being 0.2to 600 Pa,
c) dynamic loss modulus being 0.2 to 250 Pa, and
d) average particle diameter of particles contained in the tofu puree being 2 to 15 μm and 90% particle diameter thereof being 35 μm or smaller, are not known and there is no reference disclosing such noodles.

In view of the above-mentioned Prior Arts, the inventors have completed the present invention as a result of discovering that noodles with excellent texture and good taste can be produced by using tofu puree having the specific physicochemical properties.

SUMMARY OF THE INVENTION

The present invention provides noodles with excellent texture and good taste containing tofu puree having specific physicochemical properties.

The present invention relates to noodles containing tofu puree having physicochemical properties of a) viscosity being 20 to 3,000 mPa·s, b) dynamic storage modulus being 0.2 to 600 Pa, c) dynamic loss modulus being 0.2 to 250 Pa, and d) average particle diameter of particles contained in the tofu puree being 2 to 15 μm and 90% particle diameter thereof being 35 μm or smaller.

DISCLOSURE OF THE INVENTION

An object of the present invention is to provide noodles with excellent texture and good taste containing tofu puree having specific physicochemical properties.

The present invention that accomplishes the above-mentioned object is noodles containing tofu puree having the following physicochemical properties of a) through d):

a) viscosity being 20 to 3,000 mPa·s, b) dynamic storage modulus being 0.2 to 600 Pa, c) dynamic loss modulus being 0.2 to 250 Pa, and d) average particle diameter of particles contained in the tofu puree being 2 to 15 μm and 90% particle diameter thereof being 35 μm or smaller, and wherein the tofu puree content of 20 to 50% (hereafter referred to as aspect 1), and pasta noodles (hereafter referred to as aspect 2) are adopted as preferred aspects.

The present invention will now be described in further detail.

Any tofu puree can be used in the present invention as long as it is tofu puree having physicochemical properties that:

a) viscosity is 20 to 3,000 mPa·s, b) dynamic storage modulus is 0.2 to 600 Pa, c) dynamic loss modulus is 0.2 to 250 Pa, and d) average particle diameter of particles contained in the tofu puree is 2 to 15 μm and 90% particle diameter thereof is 35 μm or smaller.

Specifically, such tofu puree can be produced by the method described in detail with examples given later in accordance with the method in the Description of International Application of PCT/JP98/03183 filed by the applicant of the present application.

Specifically, tofu puree is produced using the device shown in FIG. 1. FIG. 1 is a schematic diagram showing one example of the device used for producing the tofu puree of the present invention. The device in FIG. 1 has raw materials tank 1 (stainless steel, Morinaga Engineering Co., Ltd.), heating means 3 (plate heater; Morinaga Engineering Co., Ltd.), holding pipe 6 (Morinaga Engineering Co., Ltd.), first emulsification dispersion means 10 (MILDER; Ebara Seisakujo), cooling means 11 (plate cooler; Morinaga Engineering Co., Ltd.), and second emulsification dispersion means 14 (homogenizer; Sanmaru Kikai Co.,Ltd.).

Further, coagulant supply means 7 for supplying coagulant (Morinaga Engineering Co., Ltd.) is connected between heating means 3 and holding pipe 6.

The device for producing tofu puree in FIG. 1 has piping and equipment for disinfecting in advance the pipe path in the step before production of tofu puree and piping and equipment for washing the piping path after the production of tofu puree, but illustrations of both of these have been omitted. In addition, there are various pressure gauges and thermometers for checking the pressure inside the piping and liquid temperature, as well as equipment for automatic control of pressure, temperature, etc., at various places, but illustrations of these have been omitted.

Furthermore, there are piping for returning the liquid from the outlet piping to the inlet piping if the production conditions are not reached in heating means 3, first emulsification dispersion means 11, cooling means 12, and second emulsification dispersion means 15, a mixer for uniformly mixing starting soy milk, by-pass piping for emergencies, periodic maintenance and the like, and piping and equipment such as flow control valves that are needed to adjust the quantity of flow in the piping path, etc., but illustrations of all of these have been omitted.

Tofu puree can be made by operation as shown in each example using this device.

The taste and texture of the noodles can be improved even further by bringing the tofu puree content of the noodle raw materials to 20 to 50% in aspect 1 of the present invention.

The noodles of the present invention can be any noodle as long as it is a food product in strips, strings, or the like, known as so-called noodles, and pasta, such as spaghetti, vermicelli, macaroni, lasagna, etc., noodles, such as soba, udon, somen, hiyamugi, kishimen, ramen, chanpon, reimen, yakisoba, bifun, etc., are specific examples.

Furthermore, taste and texture of the noodles are markedly improved when the noodles are pasta noodles in aspect 2 of the present invention.

In addition to the tofu puree, any ingredient can be added to the noodles of the present invention as long as it is normally used in noodles. Specific examples are grain flours, such as wheat flour, soba flour, rice flour, corn flour, etc., starches, such as potato starch, tapioca starch, waxy maize starch, processed starch, etc., glutens, such as active gluten, wheat gluten, etc., and they are used as needed in accordance with the type of noodle. Incidentally, wheat farina and duram wheat semolina are particularly preferred as the wheat flours for pasta.

Other ingredients that can be selected and added as needed are salts such as table salt, yam, konjak powder, seaweeds, calcium preparations (calcium carbonate, calcium lactate, etc.), chicken eggs, emulsifiers (monoglyceride, etc.), tomato powder, spinach powder, and the like.

The noodle product is produced using the above-mentioned raw materials.

Macaroni production will be described as an example of producing noodles. Macaroni is produced going through each process of combining materials as appropriate, such as tofu puree, grain flour (duram semolina, etc.), starch (potato starch, etc.), powdered wheat gluten, etc., adding water as needed, when the water content of the tofu puree is insufficient, to bring the water content per total amount of raw materials to 20 to 40% and uniformly mixing, degassing, high-pressure extrusion molding (pressure of about 100 to 150 kg/cm$^2$), cutting, and drying.

The above-mentioned noodles containing tofu puree are noodles with excellent texture and good taste containing tofu puree having the specific physicochemical properties, as is clear from the examples given below. That is, the noodles containing tofu puree of the present invention solve all of the problems that occur when conventional soybean products are used in noodles and are very useful in expanding the use of soybean products in a variety of noodles.

The present invention will now be described in detail with examples. The following testing methods were used in the present invention:

(1) Method of Determining Viscosity of Each Sample

Once each prepared sample had been set aside for 24 hours at 10° C., a No. 2 or No. 4 rotor was attached to a type B viscometer (DVL-BII; made by Tokimec) and viscosity thereof was determined at the number of rotations of the rotor of 60 rpm.

(2) Method of Determining Dynamic Storage Modulus and Dynamic Loss Modulus of Each Sample Once each prepared sample had been set aside for 24 hours at 10° C., dynamic storage modulus and dynamic loss modulus thereof were determined at a frequency of 50.0 rad/s using the ARES visco-elasticity determination system (made by Rheometric Scientific FE).

(3) Method of Determining Average Particle Diameter and 90% Particle Diameter of Each Sample Once each prepared sample had been set aside for 24 hours at 10° C., the average particle diameter (particle diameter corresponding to 50% of the particle size cumulative distribution) and the 90% particle diameter (particle diameter corresponding to 90% of the particle size cumulative distribution) thereof were determined using a laser diffraction-type particle size distribution determination device (LA-500; made by Horiba Seisakusho).

(4) Method of Testing Texture of Each Sample

Each sample that had been heat treated for 6 minutes in boiling water was subjected to sensory test by a panel consisting of 20 men and women ages 20 to 40 using the following evaluation method:

Each sample was evaluated by the 4 grades of:
- 0 points=good texture
- 1 point=fair texture
- 2 points=somewhat poor texture
- 3 points=poor texture and the average score of each sample was calculated and each sample was assessed based on the criteria of:
- good=less than 0.5 point
- fair=0.5 point or higher, less than 1.5 points
- somewhat poor=1.5 points or higher, less than 2.5 points
- poor=2.5 points or higher, less than 3.0 points.

(5) Method of Evaluating Taste of Each Sample

Each sample that had been heat treated for 6 minutes in boiling water was subjected to sensory test by a panel consisting of 20 men and women ages 20 to 40 using the following evaluation method:

Each sample was evaluated by the 4 steps of
- 0 points=good taste
- 1 point=fair taste
- 2 points=somewhat poor taste
- 3 points=poor taste and the average score of each sample was calculated and each sample was assessed based on the criteria of:
- good=less than 0.5 point
- fair=0.5 point or higher, less than 1.5 points
- somewhat poor=1.5 points or higher, less than 2.5 points
- poor=2.5 points or higher, less than 3.0 points.

Test Example 1

This test was performed in order to compare spaghetti obtained by prior art with spaghetti of the present invention.

(1) Preparation of Samples to be Tested

The 9 types of samples shown below were prepared:

Sample 1: A spaghetti sample of the present invention containing tofu puree produced by the same method as in Example 1.

Sample 2: A spaghetti sample made by the same method as in Example 1 described below, with the exception that tofu paste instead of tofu puree was used, which was obtained by processing firm tofu produced by the same method as in Reference Example 2 into paste with a silent cutter in accordance with Example 1 of Prior Art 1.

Sample 3: A spaghetti sample produced by the same method as Example 1 of the present invention, with the exception that tofu paste instead of tofu puree was used, which was obtained by a method in which glucono-delta-lactone was added to soy milk produced by the same method as in Reference Example 1, and the product was coagulated, dehydrated and converted to paste with a high speed cutter in accordance with the method of Example 1 of Prior Art 2.

Sample 4: A spaghetti sample produced by the same method as in Example 1 of the present invention, with the exception that tofu paste instead of tofu puree was used, which was obtained by a method in which coagulant was added to soy milk produced by the same method as in Reference Example 1, uniformly mixed and kept at 80° C. for 5 seconds to produce a coagulation product and this coagulation product was processed to paste with a homogenizer in accordance with Example 1 of Prior Art 3.

Sample 5: A spaghetti sample produced by the same method as in Example 1 of the present invention, with the exception that tofu paste instead of tofu puree was used, which was obtained by a method in which the same coagulant as in Example 1 of the present invention was added to soy milk produced by the same method as in Reference Example 1, uniformly mixed and kept at 80° C. for 5 seconds to produce a coagulation product and this coagulation product was processed to paste in accordance with the method of Example 1 of Prior Art 3.

Sample 6: A spaghetti sample produced by the same example as in Example 1 of the present invention, with the exception that the tofu puree was changed to 0.5 kg soy flour and 3.35 kg tap water in accordance with the disclosure in Prior Art 4.

Sample 7: A spaghetti sample produced by the same method as in Example 1 of the present invention, with the exception that the tofu puree was changed to the soy milk produced by the same method as in Reference Example 1 in accordance with the disclosure of Prior Art 5.

Sample 8: A spaghetti sample produced by the same method as in Example 1 of the present invention, with the exception that the tofu puree was changed to tofu puree produced by the same method as in Reference Example 2 in accordance with the disclosure in Prior Art 5.

Sample 9: A spaghetti sample produced by the same method as in Example 1 of the present invention, with the exception that 6.15 kg durum semolina flour (made by Nihon Seifun), 3.85 kg soy milk produced by the same method as in Reference Example 1, and 0.26 kg glucan and 8 g bittern were mixed with a HOBART mixer (made by Hobart) to produce approximately 10 kg dough in accordance with the disclosure in Prior Art 6.

(2) Testing Methods

The texture and taste of each sample were determined by the above-mentioned testing methods.

(3) Test Results

The test results are as shown in Table 1. As is clear from Table 1, it was concluded that sample 1 of the present invention has superior texture as compared with samples 2 through 5, sample 8 and sample 9 of the Prior Arts.

Moreover, it was concluded that sample 1 of the present invention has superior taste as compared with sample 6 and sample 7 of the Prior Arts.

Furthermore, tests were performed while changing the type of soy milk and type of tofu as appropriate, but approximately the same results were obtained.

TABLE 1

| Sample No. | Texture | Taste |
|---|---|---|
| 1 | Good | Good |
| 2 | Poor | Fair |
| 3 | Poor | Fair |
| 4 | Poor | Fair |
| 5 | Poor | Fair |
| 6 | Fair | Poor |
| 7 | Fair | Poor |
| 8 | Poor | Fair |
| 9 | Poor | Somewhat poor |

Test Example 2

This test was conducted in order to investigate physico-chemical properties of tofu puree necessary to produce noodles with excellent texture and taste using texture and taste of noodles containing tofu puree as the indicator.

(1) Preparation of Samples to be Tested

Five types of tofu puree samples were prepared by the same method as in Example 1, with the exception that the treatment pressure of the homogenizer was adjusted to change the physicochemical properties of viscosity, dynamic storage modulus, and dynamic loss modulus thereof. Five types of spaghetti samples were prepared by the same method as in Example 1 by using each tofu puree sample.

(2) Testing Methods

Viscosity, dynamic storage modulus, dynamic loss modulus, average particle diameter and 90% particle diameter of each tofu puree, as well as texture and taste of each spaghetti sample, were determined by the above-mentioned testing methods.

(3) Test Results

The test results are as shown in Table 2. As is clear from Table 2, it was concluded that in order to produce noodles with excellent taste and texture, the tofu puree that is used must have physicochemical properties of an average particle diameter of particles contained in the tofu puree being 2 to 15 $\mu$m and 90% particle diameter of particles contained in the tofu puree being 35 $\mu$m or smaller, viscosity thereof being 20 to 3,000 mPa·s, dynamic storage modulus thereof being 0.2 to 600 Pa, and dynamic loss modulus thereof being 0.2 to 250 Pa.

Furthermore, the tests were conducted with the type of soy milk, type of coagulant, and emulsification dispersion means being changed as appropriate, but almost the same results were obtained.

of the solid content of the soy milk to 100 kg of the above-mentioned soy milk that had been cooled to 70 to 75° C. and set aside for 10 minutes. The coagulation product that was obtained was gently broken up and transferred to a mold and squeezed for 20 minutes to produce approximately 80 kg tofu. This tofu was taken out, cooled with water, and cut. The water content of the firm tofu that was obtained was approximately 87%.

BRIEF DESCRIPTION OF THE DRAWINGS

FIG. 1 is a schematic drawing showing an example of a device for producing tofu puree used in the present invention.

DEFINITION OF SYMBOLS

1. Raw materials tank
2. Quantitative pump
3. Heating means (plate heater)
4. Heat source
5. Temperature controller
6. Holding pipe
7. Coagulant supply means
8. Coagulant tank
9. Quantitative pump
10. First emulsification dispersion means (MILDER)
11. Cooling means (plate cooler)

TABLE 2

| Viscosity (mPa·s) | Dynamic storage modulus (Pa) | Dynamic loss modulus (Pa) | Average particle diameter ($\mu$m) | 90% particle diameter ($\mu$m) | Texture | Taste |
|---|---|---|---|---|---|---|
| 10 | 0.1 | 0.1 | 1.0 | 10.2 | Poor | Good |
| 20 | 0.2 | 0.2 | 2.0 | 15.3 | Good | Good |
| 1100 | 14.5 | 8.7 | 13.4 | 23.1 | Good | Good |
| 3000 | 600.0 | 250.0 | 15.0 | 35.0 | Good | Good |
| 4000 | 647.5 | 258.6 | 21.2 | 38.5 | Poor | Poor |

Reference Example 1

Sixty kilograms soy beans produced in the US (IOM; imported by Mitsui Bussan) were washed and soaked for 12 hours under running water to swell the soybeans. These immersed soybeans and 170 kg water were fed to a grinder (Nagasawa Kikai Seisakusho) and ground to prepare approximately 220 kg of mash. This approximately 220 kg of mash were boiled for 4 minutes at 100° C. using a continuous cooking kettle (made by Nagasawa Kikai Seisakusho) and separated into soy milk and lees using a press (made by Arai Tekkosho) to produce approximately 190 kg soy milk. The solid content of the soy milk obtained was approximately 13%.

Reference Example 2

Sixty kilograms of the same US soybeans as in the above-mentioned Reference Example 1 were soaked and the soaked soybeans were fed with 570 kg of water to a grinder and ground to prepare approximately 620 kg of mash. Approximately 620 kg of this mash were boiled for 4 minutes at 100° C. using a continuous cooking kettle and separated into soy milk and lees with a press, and approximately 600 kg soy milk was obtained. Solid content of the soy milk obtained was approximately 4.5%.

Calcium sulfate (made by Tomita Seiyaku) suspended in tepid water was added at a concentration of 7.8% in terms 12. Coolant
13. Temperature controller
14. Second emulsification dispersion means (homogenizer)

BEST MODE FOR CARRYING OUT THE INVENTION

The present invention will now be described in further detail with examples, but the present invention is not limited to the following examples.

EXAMPLE 1

1) Preparation of Tofu Puree

The tofu puree used in the present invention was produced as follows using the device for producing tofu puree shown in FIG. 1.

One-hundred kilograms soy milk with a solid content of 13% and at a temperature of 10° C. that had been stored in raw materials tank 1 and produced by the same method as in Reference Example 1 were pumped to heating means 3 by quantitative pump 2 (made by Nakakin) equipped with a flow control valve and the soy milk that flowed into heating means 3 was heated to 60° C. by warm water in heat source 4 controlled by temperature controller 5 (made by Yokogawa Denki) and pumped to holding pipe 6 at 28 ml/second.

Coagulant [magnesium chloride (made by Nichia Kagaku Kogyo)] stored in coagulant tank 8 in coagulant supply means 7 (Morinaga Engineering Co.; Ltd.) was fed to the soy milk to be pumped from heating means 3 by quantitative pump 9 equipped with a flow control valve (made by FMI) at 0.4 ml/second in order to be added at a rate of 4% in terms of solid content of the soy milk and uniformly mixed. This mixture was held in holding pipe 6 for 3 seconds at 60° C. to produce coagulation product and transferred to first emulsification dispersion means 10 (MILDER; made by Ebara Seisakusho).

The soy milk coagulation product that had flowed into first emulsification dispersion means 10 (MILDER; Ebara Seisakusho) was immediately pre-crushed to an average particle diameter of 20 $\mu$m at a MILDER rotation speed of 12,000 rpm and transferred to cooling means 11. The pre-crushed product that had been transferred to cooling means 11 was cooled by cold water, or coolant 12, that had been kept at 30° C. by temperature controller 13 (made by Yokogawa Denki) and transferred to second emulsification dispersion means 14 (homogenizer, made by Sanmaru Kikai Kogyo).

The pre-crushed product that had been transferred to the second emulsification dispersion means 14 (homogenizer, Sanmaru Kikai Kogyo) was crushed to an average particle diameter of 13.4 $\mu$m and 90% particle diameter of 23.1 $\mu$m at a treatment pressure of 12 MPa.

The tofu puree that was obtained was tofu puree that did not feel rough to the tongue and had excellent texture and good taste with a viscosity of 1,100 mPa·s, dynamic storage modulus of 14.5 Pa, dynamic loss modulus of 8.7 Pa, and average particle diameter of particles contained in the tofu puree of 13.4 $\mu$m and 90% particle diameter of particles contained in the tofu puree of 23.1 $\mu$m.

2) Preparation of Spaghetti Containing Tofu Puree

First, 6.15 kg duram semolina flour (made by Nihon Seifun) and 3.85 kg of the above-mentioned tofu puree were mixed in a HOBART mixer (made by Hobart) to produce approximately 10 kg dough. Next, 9 kg of this dough were extruded under high pressure of 100 kg/cm$^2$ using a BONNOT extrusion molding device (made by Bonnot) with cylindrical dies having a diameter of 2 mm. The molded product that was obtained was cut to a length of 25 cm at the die surface. Then this molded product was dried for 12 minutes at 105° C. and cooled to room temperature to obtain 5 kg spaghetti product with a water content of 8%.

As a result of testing a sample, which was prepared by heat treating part of this product for 6 minutes in boiling water, by the above-mentioned texture and taste testing methods, the sample exhibited excellent texture and good taste.

EXAMPLE 2

1) Preparation of Tofu Puree

Tofu puree was produced as follows using the same tofu puree production device as in above-mentioned Example 1 with some of the production conditions being changed.

One-hundred kilograms soy milk with a solid content of 13% at a temperature of 10° C. that had been stored in raw materials tank 1 and had been produced by the same method as in Reference Example 1 were fed to heating means 3 and heated to 80° C. by heating means 3. Coagulant [magnesium chloride (made by Nichia Kagaku Kogyo)] was added to this milk by coagulant supply means 7 at a ratio of 4% in terms of the solid content of the soy milk and uniformly mixed. The mixture was held for 3 seconds at 80° C. by holding pipe 6 to produce coagulation product.

This soy milk coagulation product was immediately pre-crushed by first emulsification dispersion means 10 to an average particle diameter of 10 $\mu$m at a MILDER rotation speed of 12,000 rpm. Then it was transferred to cooling means 11 and cooled to 30° C. by cooling means 11.

This pre-crushed product was immediately crushed by second emulsification dispersion means 14 to an average particle diameter of 4.8 $\mu$m and 90% particle diameter of 8.0 $\mu$m at a treatment pressure of 3 MPa.

As with the tofu puree that was obtained in Example 1, the tofu puree obtained here was tofu puree that did not have a rough feeling to the tongue and had excellent texture and good taste with a viscosity of 233 mPa·s, dynamic storage modulus of 1.5 Pa, dynamic loss modulus of 1.1 Pa, average particle diameter of particles contained in the tofu puree of 4.8 $\mu$m, and 90% particle diameter of particles contained in the tofu puree of 8.0 $\mu$m.

2) Preparation of Macaroni Containing Tofu Puree

One kilogram duram semolina flour (made by Nihon Seifun), 5 kg corn flour, and 4 kg of the above-mentioned tofu puree were mixed in a HOBART mixer (by Hobart) to produce approximately 10 kg dough. Next, 9 kg of this dough were extruded under high pressure of 150 kg/cm$^2$ using a BONNOT extruder (made by Bonnot) with elbow macaroni dies. The molded product that was obtained was cut to a length of 3 cm at the die surface. Next, this molded product was dried for 12 minutes at 105° C. and cooled to room temperature to obtain 5 kg macaroni product with a water content of 8%.

As a result of testing a sample, which was prepared by heat treating part of this product for 6 minutes in boiling water, by the above-mentioned texture and taste testing methods, the sample exhibited excellent texture and good taste.

EXAMPLE 3

1) Preparation of Tofu Puree

Tofu puree was produced as follows using the same tofu puree production device as in above-mentioned Example 1 with some of the production conditions being changed.

One-hundred kilograms soy milk with a solid content of 10% at a temperature of 10° C. that had been stored in raw materials tank 1 and had been produced by the same method as in Reference Example 1 were transferred to heating means 3 and heated to 85° C. by heating means 3.

Coagulant [calcium chloride (made by Tomita Seiyaku)] were added to this milk by coagulant supply means 7 at a ratio of 3% in terms of the solid content of the soy milk and uniformly mixed. The mixture was held for 5 seconds at 85° C. by holding pipe 6 to produce coagulation product.

This soy milk coagulation product was immediately pre-crushed by first emulsification dispersion means 10 to an average particle diameter of 14 $\mu$m at a MILDER rotation speed of 12,000 rpm. Then it was transferred to cooling means 11 and cooled to 30° C. by cooling means 11.

This pre-crushed product was immediately pulverized by second emulsification dispersion means 14 to an average particle diameter of 4.2 $\mu$m and 90% particle diameter of 6.8 $\mu$m at a treatment pressure of 12 MPa.

As with the tofu puree that was obtained in Example 1, the tofu puree obtained here was tofu puree that did not have a rough feeling to the tongue and had excellent texture and good taste with a viscosity of 74 mPa·s, dynamic storage modulus of 1.0 Pa, dynamic loss modulus of 0.9 Pa, average particle diameter of particles contained in the tofu puree of 4.2 $\mu$m, and 90% particle diameter of particles contained in the tofu puree of 6.8 $\mu$m.

2) Preparation of Spaghetti Containing Tofu Puree

Six kilogram duram semolina flour (made by Nihon Seifun) and 4 kg of the above-mentioned tofu puree were mixed in a HOBART mixer (made by Hobart) to produce approximately 10 kg dough. Next, 9 kg of this dough were extruded under high pressure of 100 kg/cm2 using a BONNOT extruder (made by Bonnot) with cylindrical dies having a diameter of 2 mm. The molded product that was obtained was cut to a length of 25 cm at the die surface. Next, this molded product was dried for 12 Ad minutes at 105° C. and cooled to room temperature to obtain 5 kg spaghetti product with a water content of 8%.

As a result of testing a sample, which was prepared by heat treating part of this product for 6 minutes in boiling water, by the above-mentioned texture and taste testing methods, the sample exhibited excellent texture and good taste.

INDUSTRIAL APPLICABILITY

As previously explained in detail, the present invention relates to noodles containing tofu puree and the merits realized by the present invention are as follow:

1) Noodles having excellent texture and good taste are obtained.

2) All of the problem points that occur when conventional soy beam products are used for noodles are solved and the present invention therefore is useful for the expanding the use of soybean products in various noodles.

What is claimed is:

1. Noodles containing tofu puree, wherein the tofu puree have the following physicochemical properties a) through d):

a) viscosity of 20 to 3,000 mPa·s;

b) dynamic storage modulus of 0.2 to 600 Pa;

c) dynamic loss modulus of 0.2 to 250 Pa; and d) particles contained in the tofu puree have an average particle diameter of 2 to 15 $\mu$m and a 90% particle diameter of 35 $\mu$m or smaller.

2. Noodles containing tofu puree according to claim 1, wherein the tofu puree content is 20 to 50 (wt)%.

3. Noodles containing tofu puree according to either claim 1 or claim 2, wherein the noodles are pastas.

* * * * *